(12) United States Patent
Chan

(10) Patent No.: US 6,224,069 B1
(45) Date of Patent: May 1, 2001

(54) BODY LEVELING SYSTEM FOR MOTOR VEHICLE

(75) Inventor: Stephen K. Chan, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/246,926

(22) Filed: Feb. 8, 1999

(51) Int. Cl.$^7$ .................................................. B60G 17/00
(52) U.S. Cl. .................................. 280/6.159; 280/5.514; 280/124.16
(58) Field of Search ............................ 280/6.157, 6.159, 280/6.16, 124.16, 124.116, 5.574

(56) References Cited

U.S. PATENT DOCUMENTS

| | | | |
|---|---|---|---|
| 3,768,820 | 10/1973 | Yew | 280/6 |
| 3,785,672 | * 1/1974 | Shakespear | 280/6.157 |
| 3,881,743 | 5/1975 | Whelan | 280/124 |
| 4,518,169 | * 5/1985 | Kuroki et al. | 280/6.157 |
| 4,518,171 | * 5/1985 | Hedenberg | 280/6.159 |
| 4,756,548 | 7/1988 | Kaltenthaler | 280/702 |
| 4,829,436 | 5/1989 | Kowalik et al. | 701/37 |
| 4,867,474 | 9/1989 | Smith | 280/699 |
| 5,167,289 | 12/1992 | Stevenson | 177/141 |
| 5,193,063 | 3/1993 | Assh | 701/39 |
| 5,220,505 | * 6/1993 | Yokote et al. | 364/424.05 |
| 5,430,647 | * 7/1995 | Raad et al. | 364/424.05 |
| 5,517,847 | * 5/1996 | Campbell | 73/11.07 |

* cited by examiner

Primary Examiner—J. J. Swann
Assistant Examiner—David R. Dunn
(74) Attorney, Agent, or Firm—Jeffrey A. Sedlar

(57) ABSTRACT

A body leveling system for a motor vehicle including a rigid axle housing, a pair of dirigible wheels on the rigid axle housing, and a pair of air springs between the body and the rigid axle housing. During a turn, links between the body and the rigid axle housing effect roll understeer by turning the axle housing toward the center of the turn in response to pivotal movement of the body about its longitudinal roll axis. When the load on the vehicle body is in a moderate range from empty to four average passengers, the air springs are selectively inflated and deflated to maintain the body at curb trim. When the load on the body exceeds the moderate range in either a high range or an overload range, the air springs are sealed closed and incrementally vertically deflect as the load increases. The GVW trim of the vehicle body is below its curb trim and its center of gravity is lower at GVW than at curb trim for improved dynamic performance at GVW. In the overload range, an "overload trim" of the vehicle body is below its GVW trim to afford a visual alert of loading beyond GVW.

3 Claims, 5 Drawing Sheets

BODY LEVELING SYSTEM FOR MOTOR VEHICLE

TECHNICAL FIELD

This invention relates to a body leveling system for a motor vehicle.

BACKGROUND OF THE INVENTION

A motor vehicle having a typical solid axle rear suspension system includes a rigid axle housing linked to a body of the motor vehicle for vertical suspension excursions, a pair of road wheels rotatably supported on the rigid axle housing, and a pair of suspension springs, e.g. leaf springs, coil springs, or air springs, between the body and the rigid axle housing. The elevation of the body above the rigid axle housing, typically referred to as the "trim height" of the body, decreases incrementally from a "curb trim" when the body is empty to a lower "GVW trim" when the body is fully loaded with passengers and/or cargo, i.e. at Gross Vehicle Weight ("GVW"). During a turn, the links between the body and the rigid axle housing turn the axle housing and the road wheels toward the center of the turn in response to pivotal movement of the body about its longitudinal roll axis, a performance characteristic commonly referred to as "roll understeer". When the motor vehicle is further equipped with a body leveling system which maintains its body at curb trim regardless of the load on the body, the dynamic performance at GVW of the motor vehicle with its body at curb trim is relatively inferior to its dynamic performance with its body at GVW trim because the motor vehicle has more roll understeer and its center of gravity is lower at GVW trim than at curb trim.

SUMMARY OF THE INVENTION

This invention is a new and improved body leveling system for a motor vehicle including a rigid axle housing linked to a body of the motor vehicle for vertical suspension excursions, a pair of road wheels rotatably supported on the rigid axle housing, and a pair of suspension air springs between the body and the rigid axle housing. During a turn, the links between the body and the rigid axle housing effect roll understeer by turning the axle housing and the road wheels toward the center of the turn in response to pivotal movement of the body about its longitudinal roll axis. When the load on the vehicle body is in a moderate range from empty to four average passengers, the air springs are selectively inflated and deflated to maintain the body at curb trim. When the load on the body exceeds the moderate range in either a high range or an overload range, the air springs are sealed closed and incrementally vertically deflect as the load increases. The GVW trim of the vehicle body is below its curb trim and its center of gravity is lower at GVW than at curb trim for improved dynamic performance at GVW. In the overload range, an "overload trim" of the vehicle body is below its GVW trim to afford a visual alert of loading beyond GVW.

DESCRIPTION OF THE PREFERRED EMBODIMENT

Figure 1:
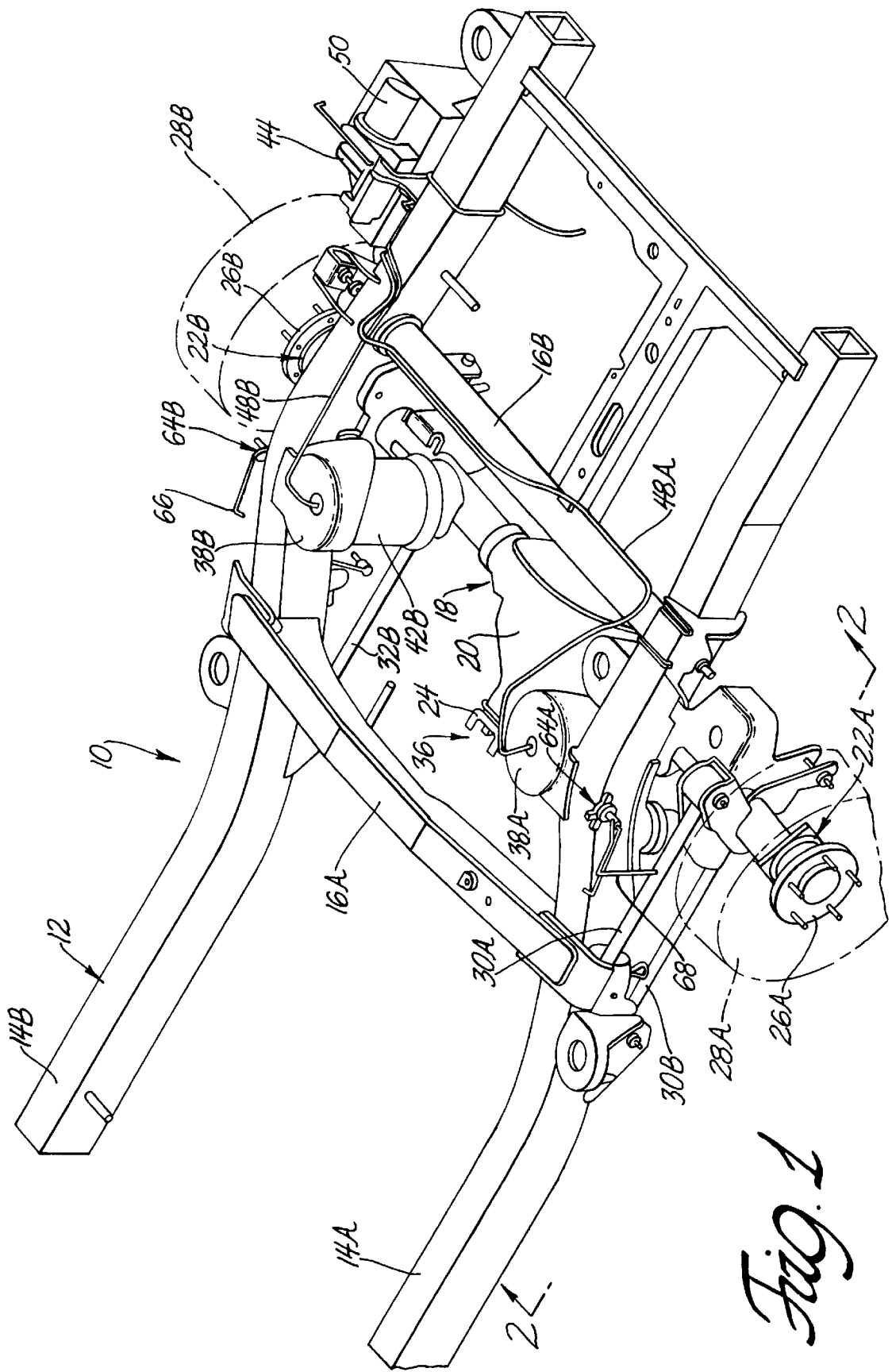
FIG. 1 is fragmentary perspective view of a motor vehicle body leveling system according to this invention.
Figure 2:
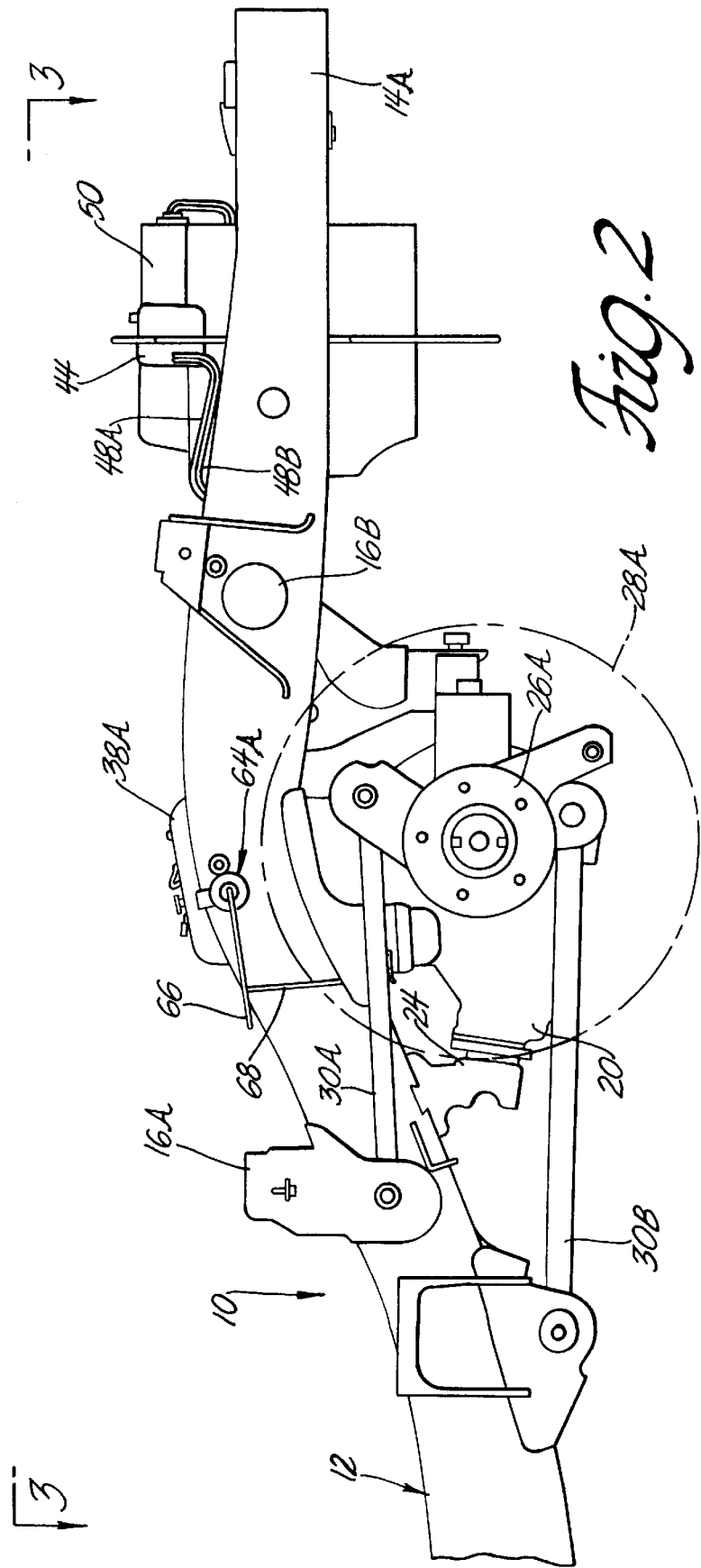
FIG. 2 is a view taken generally along the plane indicated by lines 2—2 in FIG. 1.
Figure 3:
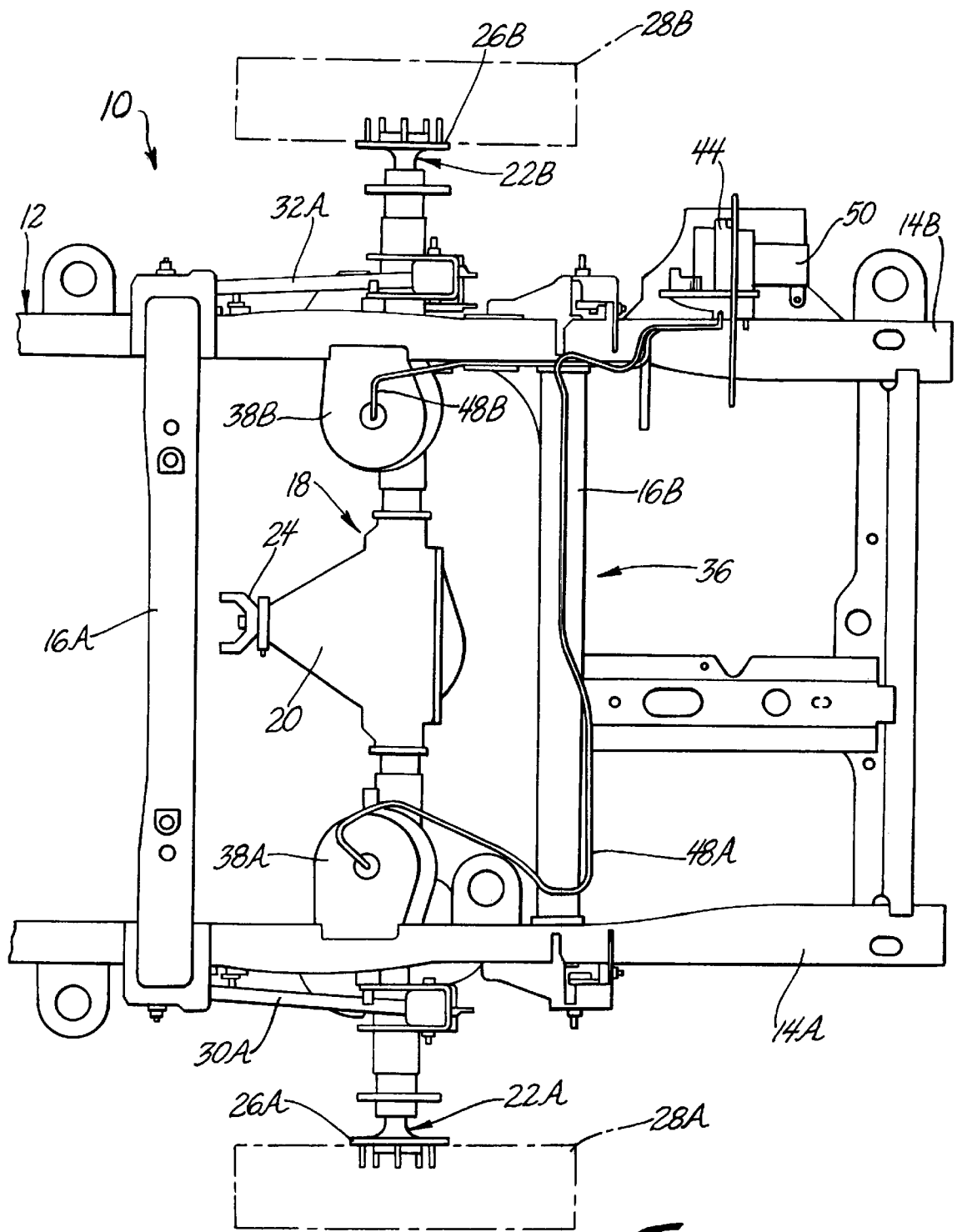
FIG. 3 is a view taken generally along the plane indicated by lines 3—3 in FIG. 2.

Referring to FIGS. 1–3, a body 10 of a motor vehicle includes a fragmentarily illustrated structural frame 12 having a pair of longitudinal side rails 14A, 14B rigidly interconnected by a pair of lateral cross members 16A, 16B. A rigid rear axle housing 18 is disposed below the body 10 and includes a centrally located differential housing 20. A pair of axle bars 22A,22B are rotatably supported on the rigid rear axle housing and connected by gears, not shown, in the differential housing to a pinion shaft 24 rotatably supported on the differential housing. The pinion shaft is connected to a motor of the motor vehicle by a conventional propeller shaft, not shown. The axle bars 22A,22B terminate outside of the rigid rear axle housing at respective ones of a pair of wheel flanges 26A,26B. A pair of schematically represented rear dirigible wheels 28A,28B are bolted to the wheel flanges 26A,26B.

The rigid rear axle housing 18 is connected to the left side of the body 10 through a pair of trailing links 30A,30B and to the right side of the body 10 through a pair of trailing links 32A,32B. A pair of steerable front dirigible wheels, not shown, are linked in conventional fashion to the body 10 for vertical suspension excursions. Trailing links 30A,30B and 32A,32D guide the rigid rear axle housing in vertical suspension excursions relative to the body 10 and induce roll understeer by turning the rigid rear axle housing and the rear road wheels toward the center of the turn when the body rolls about its roll axis.

A body leveling system 36 according to this invention includes a pair of schematically represented upper spring seats 38A,38B rigidly attached to the body 10 at respective ones of the frame rails 14A,14B and a pair of schematically represented lower spring seats 40A,40B on the rigid rear axle housing below the upper spring seats. A pair of bag-like air springs 42A,42B are disposed between the upper and lower spring seats 38A,40A and 38B,40B, respectively. An air compressor 44 communicates with the atmosphere through an inlet 46 and with the air springs 42A,42B through respective ones of a pair of branch conduits 48A,48B. The air compressor is driven by an electric motor 50 which is turned on and off by an Electronic Control Module ("ECM") 52. A pair of solenoid valves 54A,54B are disposed in respective ones the branch conduits 48A,48B and turned on and off by the ECM 52. When the solenoid valves 54A,54B are off, the branch conduits are blocked. When the solenoid valves 54A,54B are on, the branch conduits are unblocked. A pair of pressure transducers 56A,56B connected to the branch conduits 48A,48B provide electronic signals to the ECM 52 corresponding to the air pressure in the air springs 42A,42B.

Figure 4:
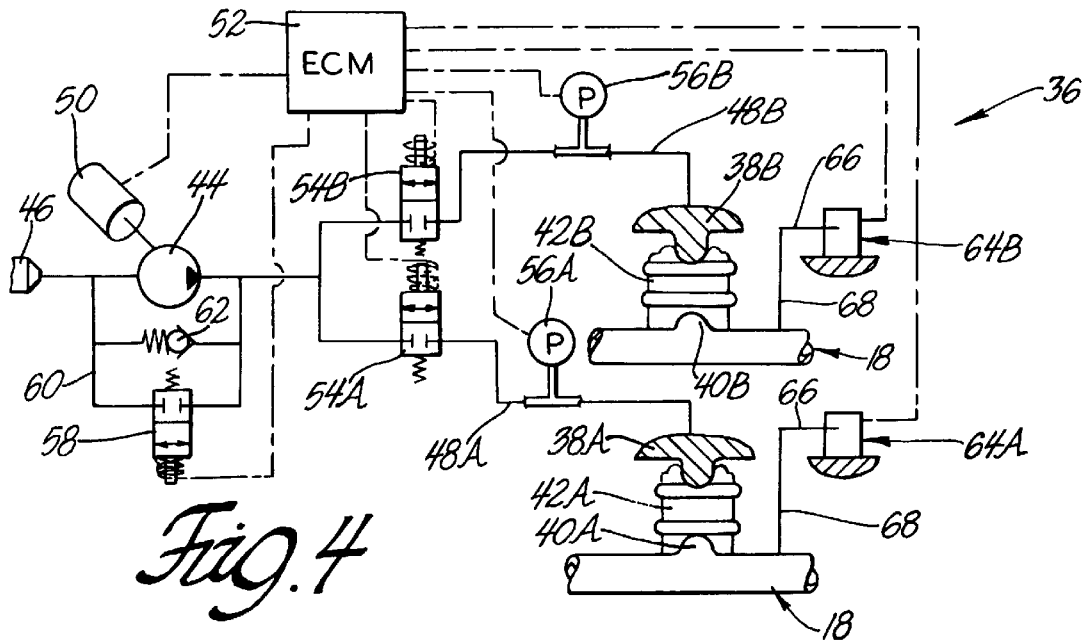
FIG. 4 is a schematic representation of the motor vehicle body leveling system according to this invention.

An exhaust solenoid valve 58, FIG. 4, is disposed in a bypass conduit 60 around the compressor 44 and turned on and off by the ECM 52. When the exhaust solenoid valve is off, the bypass conduit 60 is blocked. When the exhaust solenoid is on, the bypass conduit is unblocked. A pressure relief valve 62, FIG. 4, parallel to the exhaust solenoid valve 58 limits the air pressure in the air springs 42A,42B to a predetermined maximum magnitude consistent with maintenance of the structural integrity of the body leveling system 36.

The body leveling system 36 further includes a pair of position transducers 64A,64B mounted on the body 10 at the frame rails 14A,14B. Each position transducer includes a pivot arm 66 and a vertical connecting rod 68 attached to a corresponding one of the trailing links 30A,32A. Pivotal movement of the trailing links 30A,32A induced by relative vertical excursions between the rigid rear axle housing 18 and the body 10 induces vertical linear translation of the connecting rods 68 and corresponding pivotal movement of the pivot arms 66. Each of the position transducers provides an electronic signal to the ECM 52 characteristic of the position of its pivot arm and, therefore, characteristic of the elevation of the body 10 above the rigid rear axle housing 18, i.e. characteristic of the trim height of the vehicle body.

Figure 6:
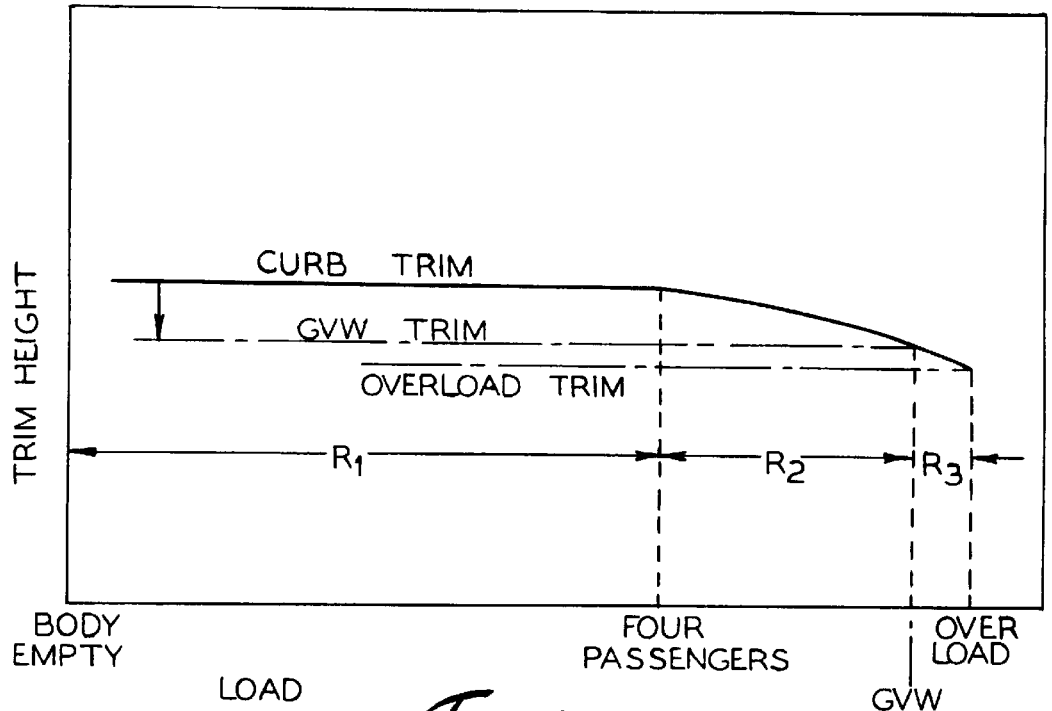
FIG. 6 is a first graphical representation of the operation of the body leveling system according to this invention.
Figure 7:
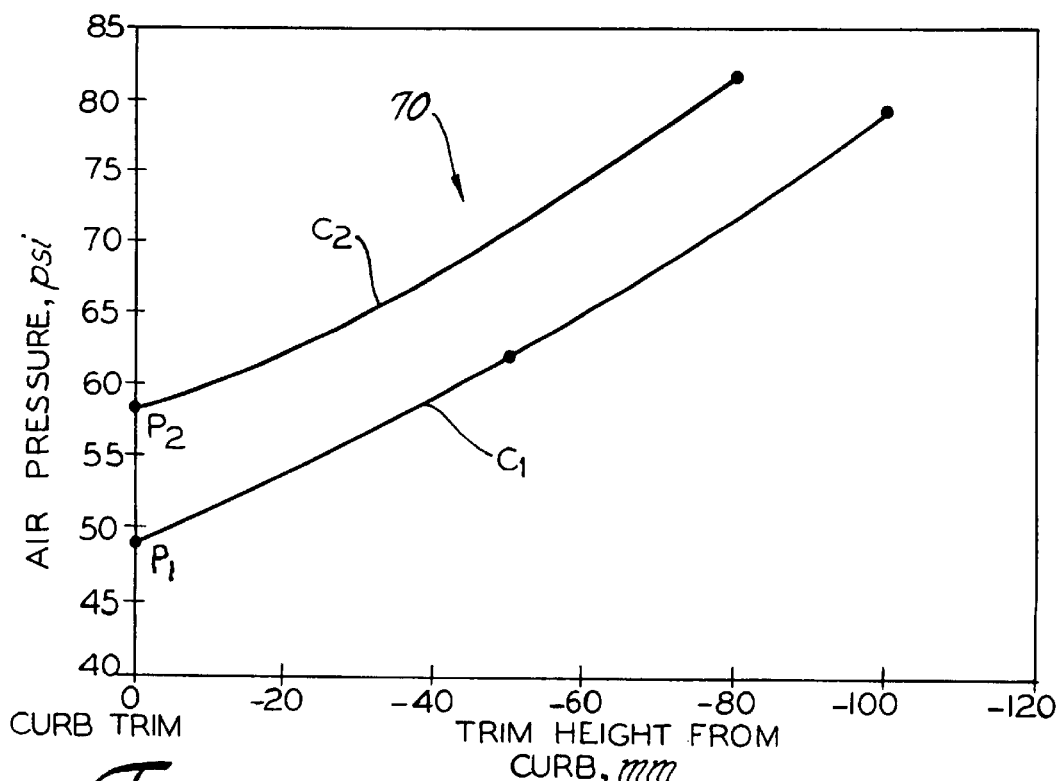
FIG. 7 is a second graphical representation of the operation of the body leveling system according to this invention.

FIG. 7 is a graphic representation or map 70 describing the relationship between the air pressure in the air springs 42A,42B and the trim height of the vehicle body 10. The map 70 is derived empirically and is unique to the particular air springs 42A,42B and spring seats 38A,38B and 40A,40B of the motor vehicle. The ECM 52 uses the map 70 to control the electric motor 50, the solenoid valves 54A,54B, and the exhaust solenoid valve 58 to maintain a constant trim height of the body 10 when the body is loaded in a moderate load range $R_1$, FIG. 6, and to permit the trim height of the body to decrease incrementally when the body is loaded in either a high range $R_2$ or an overload range $R_3$. The map 70 reflects that when the vehicle body 10 is empty and supported by the air springs 42A,42B at a curb trim, a first air pressure $P_1$ prevails in the air springs. Curb trim is a predetermined trim height of the body 10 consistent with comfortable passenger ingress and egress and comfortable loading and unloading of cargo. The map 70 further reflects that when the vehicle body 10 is loaded with four average passengers at curb trim, a second air pressure $P_2$ higher than $P_1$ prevails in the air springs. The load range between empty and four average passengers or between about 80% and 90% of GVW constitutes the aforesaid moderate range $R_1$ of vehicle body loading.

When the vehicle body is at curb trim and empty and then loaded, the air springs 42A,42B incrementally vertically deflect under the additional load and the air pressure in the air springs increases. A first characteristic curve $C_1$ of the map 70 describes the relationship between such increasing air pressure and decreasing trim height of the vehicle body from curb trim. Similarly, when the vehicle body is at curb trim with four passengers therein and then loaded further, the air springs 42A,42B incrementally vertically deflect under the additional load and the air pressure in the air springs increases. A second characteristic curve $C_2$ of the map describes the relationship between such increasing air pressure and decreasing trim height of the vehicle body from curb trim.

In operation, when the electrical system of the motor vehicle is turned on, the pressure transducers 56A,56B and the position transducers 64A,64B provide electronic signals to the ECM 52 characteristic of the air pressure in the air springs 42A,42B and of the trim height of the vehicle body 10. The ECM compares the electronic signals with the map 70 and turns on and off the electric motor 50, the solenoid valves 54A,54B, and the exhaust solenoid valve 58 to maintain the body at curb trim in the moderate range $R_1$ and to permit the trim height of the body to decrease incrementally in the high and overload ranges $R_2$ and $R_3$, FIG. 6.

For example, if the air pressure in the air springs is initially less than $P_1$ and the trim height of the body is below curb trim, the ECM turns on the solenoid valves 54A,54B and the electric motor 50 so that the compressor 44 inflates the air springs 42A,42B through the branch conduits 48A, 48B and elevates the body 10. If the body is empty when the electrical system is turned on, the ECM will turn off the electric motor and the solenoid valves 54A,54B at curb trim with air pressure $P_1$ prevailing in the air springs. If the body is loaded in the moderate range $R_1$ when the electrical system is turned on, then the ECM will turn off the electric motor 50 and the solenoid valves 54A,54B at curb trim with an air pressure between $P_1$ and $P_2$ prevailing in the air springs. If the body is loaded in the high or overload ranges $R_2, R_3$ when the electrical system is turned on, then the ECM will turn off the electric motor 50 and the solenoid valves 54A,54B at a unique combination of trim height below curb trim and an air pressure above $P_2$ defined by the second characteristic curve $C_2$.

After the trim height of the vehicle body is established as described above, the load on the vehicle body may fluctuate up and down as passengers enter and exit and cargo is loaded and unloaded. For example, if the body is empty at curb trim and then loaded in the moderate range $R_1$, the trim height will decrease and the air pressure in the air springs will increase as described by the first characteristic curve $C_1$. Then, the ECM 52 will inflate the air springs as described above to elevate the body 10 until the body attains curb trim with an air pressure between $P_1$ and $P_2$ prevailing in the air springs. If the body is empty at curb trim and then loaded in the high or overload ranges $R_2, R_3$, the trim height will decrease and the air pressure in the air springs will increase again as described by the first characteristic curve $C_1$ and the ECM 52 will thereafter inflate the air springs and elevate the body. However, in this circumstance the ultimate trim height of the body will be below curb trim and the ultimate air pressure in the air springs 42A,42B will be above air pressure $P_2$ at a unique combination described by the second characteristic curve $C_2$ of the map 70.

Conversely, if the load on the vehicle body 10 is in the moderate range $R_1$ at curb trim and then reduced by egress of passengers, the trim height of the body increases and the air pressure in the air springs decreases. In that circumstance, the ECM 52 turns on the solenoid valves 54A,54B and the exhaust solenoid valve 58 to deflate the air springs to reduce the trim height of the body to curb trim. Similarly, if the load on the body is in the high or overload ranges $R_2, R_3$ and then reduced, the ECM turns on the solenoid valves 54A,54B and the exhaust solenoid valve 58 to deflate the air springs. If the reduced load is still in the high or overload ranges, the ultimate trim height of the body 10 and air pressure in the air springs 42A,42B will be a unique combination below curb trim and above $P_2$ described by the second characteristic curve $C_2$. If the reduced load is in the moderate range, the ultimate trim height of the body 10 will be curb trim and the ultimate air pressure in the air springs 42A,42B will be between $P_1$ and $P_2$.

Figure 5A:
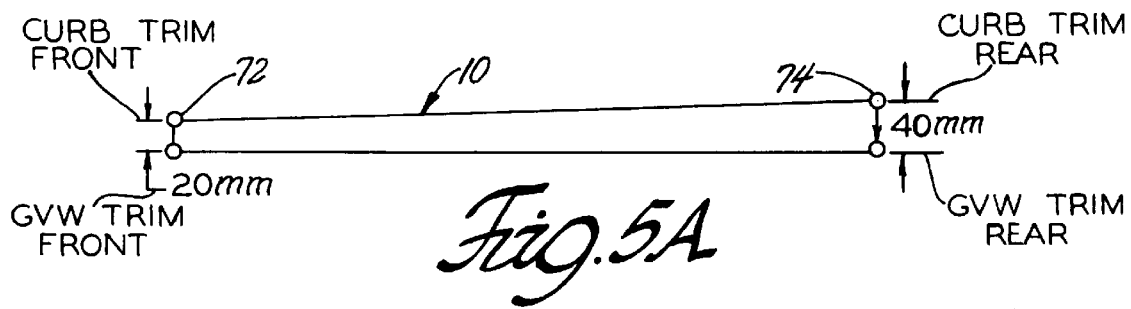
FIGS. 5A–5C are schematic diagrams comparing the performance of the motor vehicle body leveling system according to this invention with a motor vehicle having a prior body leveling system and with a motor vehicle not having a body leveling system.
Figure 5B:
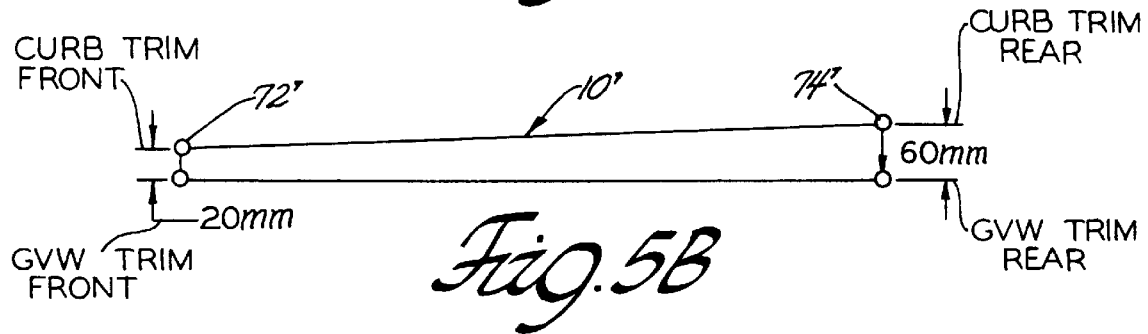
Figure 5C:
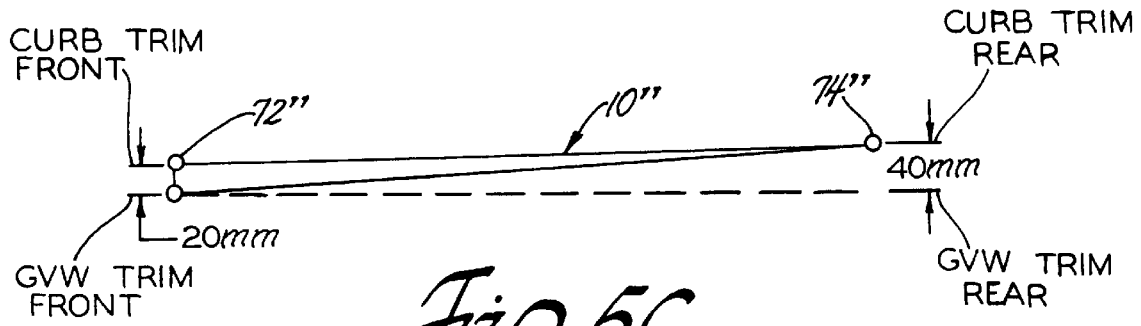

FIGS. 5A–5C compare the performance of the body leveling system 36, FIG. 5A, with a motor vehicle not having a body leveling system, FIG. 5B, and with a motor vehicle having a prior art body leveling system, FIG. 5C. More particularly, FIG. 5A is a schematic side elevational view of the body 10 illustrating a front suspension point 72 of the body suspended above a pair of front road wheels, not shown, by a pair of conventional suspension springs, not shown, and a rear suspension point 74 suspended above the rigid rear axle housing 18 by the air springs 42A,42B. The conventional front suspension springs elevate the suspension point 72 above the front road wheels at a curb trim about 20 mm higher than the GVW trim of the front suspension point. The air springs 42A,42B elevate the rear suspension point 74 above the rear rigid rear axle housing at a curb trim about 40 mm above the GVW trim of the rear suspension point. As the load on the body 10 increases in the moderate range $R_1$, the trim height of the front suspension point 72 decreases a fraction of 20 mm while the trim height of the rear suspension point 74 is maintained at curb trim as described above. Thus, throughout the moderate load range $R_1$, the trim height of the vehicle body 10 is consistent with comfortable passenger ingress and egress and with comfortable cargo loading and unloading.

As the load on the body 10 increases in the high range $R_2$ up to GVW, the trim height of the front suspension point 72 decreases to its GVW trim about 20 mm below its curb trim. At the same time, the trim height of the rear suspension point 74 decreases incrementally 40 mm from its curb trim to its GVW trim. The GVW trim of the front suspension point 72 is about equal to the GVW trim of the rear suspension point 74 so that the body 10 is level at GVW. In the circumstance that the vehicle body 10 is loaded beyond the high range $R_2$ into the overload range $R_3$, FIG. 6, the rear suspension point 74 droops relative to the front suspension point 72 to an overload trim below its GVW trim thereby to afford the operator of the motor vehicle a visual alert that GVW has been exceeded.

FIG. 5B is a schematic side elevational view of a body 10' of a motor vehicle not having a body leveling system. The body 10' has a front suspension point 72' suspended above a pair of front road wheels of the vehicle by a pair of conventional front suspension springs, not shown, and a rear suspension point 74' suspended above a rigid rear axle housing by pair of conventional rear suspension springs, not shown. The front suspension springs elevate the front suspension point 72' above the front road wheels at a curb trim about 20 mm higher than the GVW trim of the front suspension point. The rear suspension springs elevate the rear suspension point 74' at a curb trim about 60 mm above the GVW trim of the rear suspension point. As the load on the body 10' increases in the moderate load range $R_1$ and then in the high load range $R_2$, the trim height of the front suspension point 72' decreases incrementally 20 mm to its GVW trim and the trim height of the rear suspension point 74' decreases incrementally 60 mm to its GVW trim. Because the curb trim of the rear suspension point 74' of body 10' is higher in the moderate range $R_1$ than the curb trim of the body 10 in the moderate range $R_1$, passenger ingress and egress and cargo loading and unloading of the body 10' is less comfortable than passenger ingress and egress and cargo loading and unloading of the body 10.

FIG. 5C is a schematic side elevational view of a body 10" of a motor vehicle having thereon a typical prior art body leveling system, not shown. The body 10" has a front suspension point 72" suspended above a pair of front road wheels of the vehicle by a pair of conventional front suspension springs, not shown, and a rear suspension point 74" suspended above a rigid rear axle housing by a pair of air springs, not shown. The front suspension springs elevate the front suspension point 72" of the body 10" above the front road wheels at a curb trim about 20 mm higher than the GVW trim of the front suspension point. The air springs elevate the rear suspension point 74" above the rigid rear axle housing at a curb trim about 40 mm above the GVW trim of the rear suspension point 74 of the above described body 10 and are inflated and deflated to maintain curb trim of the rear suspension point 74" throughout the load ranges $R_1$, $R_2$ and $R_3$. Thus, while the curb trim of the rear suspension point 74" is the same as the curb trim of the aforesaid body 10 in the moderate load range $R_1$, the GVW trim of the body 10" is substantially higher than the GVW trim of the aforesaid body 10. Accordingly, the roll understeer performance at GVW of the motor vehicle having the prior art body leveling system is inferior to that of the motor vehicle having the body leveling system 36. Likewise, the center of gravity of the motor vehicle having the prior art body leveling system is higher than that of the motor vehicle 10 having the body leveling system 36 when both vehicles are at GVW.

Having thus described the invention, what is claimed is:

1. A motor vehicle including a vehicle body, a pair of dirigible wheels rotatably supported on a rigid axle housing, a linkage means operative to guide said rigid axle housing in vertical suspension excursions relative to said vehicle body and to induce roll understeer by turning said rigid axle housing toward the center of a turn in response to pivotal movement of said vehicle body about a roll axis thereof during said turn, a pair of air springs between said vehicle body and said rigid axle housing, and a body leveling system, characterized in that said body leveling system comprises:

a compressor means operative when turned on to inflate said air springs by pumping air into said air springs thereby to increase a trim height of said vehicle body above said rigid axle housing, an exhaust valve means operative when turned on to deflate said air springs by exhausting air therefrom thereby to decrease said trim height of said vehicle body above said rigid axle housing, a position transducer means operative to provide an electronic signal corresponding to said trim height of said vehicle body above said rigid axle housing, a pressure transducer means operative to provide an electronic signal corresponding to the air pressure in said air springs, and an electronic control means operative in response to said electronic signals from said position transducer means and said pressure transducer means to selectively turn on said compressor means and said exhaust valve means to maintain said trim height of said vehicle body at a curb trim when the load on said vehicle body is in a moderate range constituting a predetermined fraction of a predetermined gross vehicle weight of said vehicle body and at a decreasing trim height from said curb trim down to a GVW trim lower than said curb trim at said gross vehicle weight of said vehicle body.

2. The body leveling system recited in claim 1 wherein: said predetermined fraction of said gross vehicle weight of said vehicle body constituting said moderate range of loading of said vehicle body is between 80% and 90% of said gross vehicle weight of vehicle body.

3. The body leveling system recited in claim 2 wherein: said trim height of said vehicle body decreases incrementally from said GVW trim as the load on said vehicle body increases in an overload range beyond said predetermined gross vehicle weight of said vehicle body thereby to afford a visual signal that said gross vehicle weight of said vehicle body has been exceeded.

\* \* \* \* \*